Aug. 6, 1968 W. M. SOMERVILLE 3,396,291

ALTERNATING CURRENT GENERATORS

Filed Dec. 7, 1965 2 Sheets-Sheet 1

INVENTOR
WILLIAM MURRAY SOMERVILLE
BY: Jacobs & Jacobs
ATTORNEYS

Aug. 6, 1968   W. M. SOMERVILLE   3,396,291
ALTERNATING CURRENT GENERATORS
Filed Dec. 7, 1965   2 Sheets-Sheet 2

INVENTOR
WILLIAM MURRAY SOMERVILLE
BY: Jacobs & Jacobs
ATTORNEYS

_United States Patent Office_

3,396,291
Patented Aug. 6, 1968

3,396,291
ALTERNATING CURRENT GENERATORS
William Murray Somerville, Newcastle-upon-Tyne, England, assignor to Clarke, Chapman & Co. Limited, Durham, England, a company of Great Britain and Northern Ireland
Filed Dec. 7, 1965, Ser. No. 512,112
Claims priority, application Great Britain, Dec. 10, 1964, 50,318/64
10 Claims. (Cl. 310—263)

This invention relates to high speed electric alternators of the solid rotor type.

Various proposals have been made for the construction of these alternators with the object of obtaining high generating capacity with the least possible bursting stress on the solid rotor. The latter runs at speeds in the range of tens of thousands of revolutions per minute, and necessarily consists of at least two ferromagnetic parts joined together by at least one insert of non-magnetic material, so that complete peripheral continuity or homogeneity over the whole length of the rotor is unattainable.

Objects of the present invention are to provide an improved form of rotor which is better able to withstand centrifugal force and enables the provision of larger excitation coils, and an improved alternator wherein the whole of the high speed rotor is totally surrounded by fixed structure of great strength.

The invention provides a solid rotor for a high speed electric alternator, comprising firstly a ferromagnetic element having at the middle portion of its length at least one radial pole projection, a solid cylindrical portion on each side of said middle portion, a further portion in the form of a solid of revolution beyond each of said cylindrical portions, and a bearing trunnion at each end; and secondly a yoke comprising two enantiomorphic ferromagnetic ring elements each having at least one recess to accommodate one half of said radial pole projection and, to surround one of said solid cylindrical portions, a continuous end having an external periphery with a reducing taper outwardly from said recess, the two yoke elements being secured together at the median transverse plane where they abut each other by the peripheral surface extending between the circumferential limits of the registering recesses in the two yoke elements; said three elements jointly affording a continuous gap between their opposed internal surfaces which gap is transverse to the axis at each end of said pole projection, parallel or radial to the axis at each side of said pole projection and otherwise circumferential; and said gap being infilled with a non-magnetic material to bond the ferromagnetic elements together as a unitary rotor.

In a two pole rotor, said yoke elements have single recesses which are registered to accommodate a single pole projection, and the united portions of said yoke elements opposite said pole projection afford the other pole under electromagnetic excitation.

In a rotor having four poles or a greater even number of poles, i.e. a number of pairs of poles, each of the yoke elements has two, three or more recesses which mutually register to accommodate the pole projections, and the portions of said yoke elements which are united between the circumferential limits of said pole projections afford the magnetically opposite poles under excitation.

Said further portions of the first ferromagnetic element which extend beyond the ends of the yoke elements, may be cylindrical or preferably, for a purpose hereinafter stated, may have a reducing taper from the ends of the yoke elements towards the trunnions, which taper has the same angle as that of the end portions of the yoke elements.

In an alternator, a rotor constructed as hereinbefore stated has its middle portion, which comprises the poles, surrounded completely by a core on which the stator windings are mounted. The remainder of the rotor at each end may be surrounded by one of a pair of annular casings for excitation coils. Each of these casings advantageously may have in radial section a hollow, inwardly open, rectangular form with a tapered section on one limb which closely surrounds the tapered portion of one yoke element of the rotor, and a broad foot section on the other limb which surrounds the portion of said first element of the rotor that projects from the yoke element.

When the last mentioned projecting portions of the rotor are tapered as hereinbefore referred to, said foot sections of the excitation coil casings may likewise be tapered. The angles of all the tapered surfaces are equal, and this arrangement is for the purpose of enabling axial adjustment of the excitation coil casings relative to the rotor, so as to enable the attainment of the minimum practicable air gap between all the opposed surfaces of the rotor and said casings which are included in the magnetic circuit.

An embodiment of a high speed alternator constructed and including a solid rotor according to the invention will be described by way of example with reference to the accompanying diagrammatic drawings, wherein.

Figure 1:
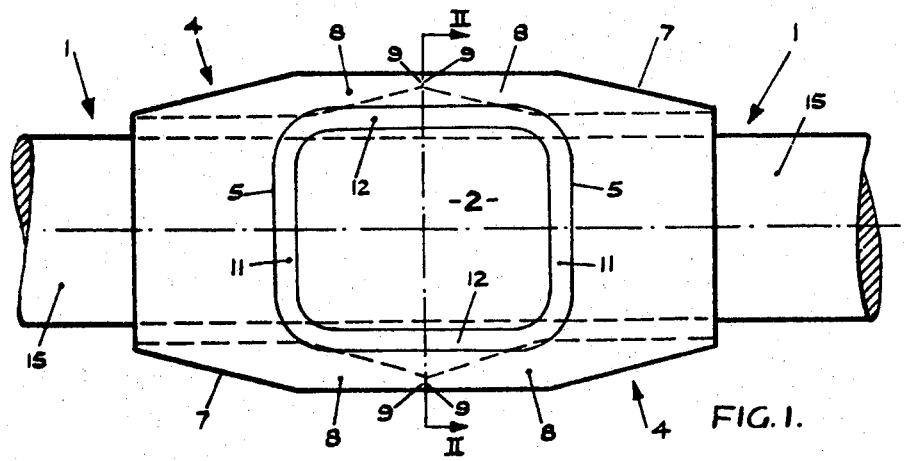
FIG. 1 is a side view of a four-pole rotor.
Figure 2:
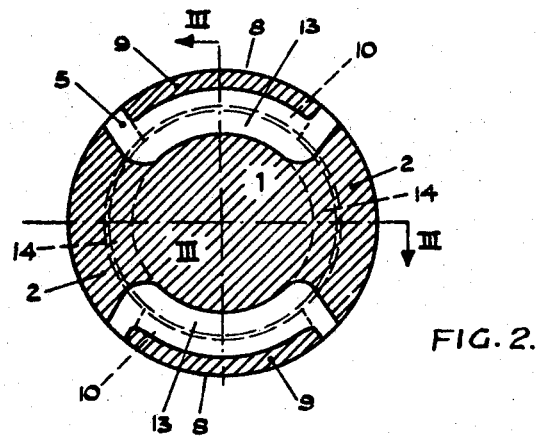
FIG. 2 is a transverse section on the line II—II of FIG. 1.
Figure 3:
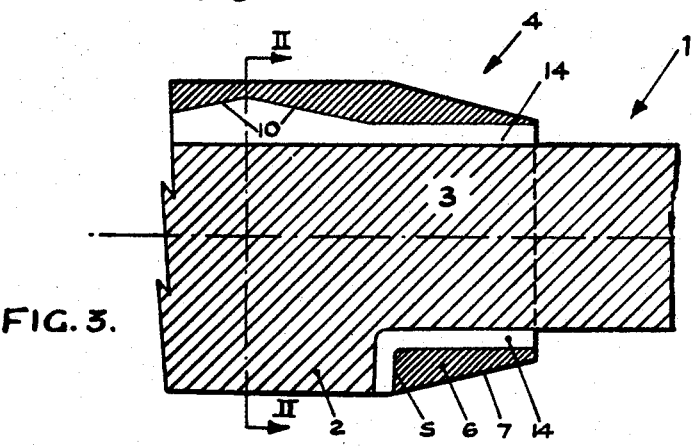
FIG. 3 is a double radial section on the line III—III—III of FIG. 2.

The rotor as illustrated in FIGS. 1–3 comprises a first, unitary and homogeneous element 1, of a suitable ferrous alloy having high strength and low reluctance, which is basically a long cylinder portion of 70 mm. diameter having at its middle two sector-form projections 2 which constitute one pair of poles, say the N poles. These projections are substantially rectangular and extend equally on both sides of the median transverse plane indicated by the line II—II, as shown in FIG. 1. Said middle portion and two adjacent cylindrical portions 3, 3, are shrouded by a second member of the like ferrous alloy, which is made by securing together two enantiomorphic ring elements 4, each of which has an opposed pair of recesses 5 to accommodate one half of each of the pole projections 2. Each element 4 has an outer end portion 6 with an outwardly tapering peripheral surface 7, and two inner end portions 8, locatable between the substantially radial surfaces of the pole projections 2 and terminating with arcuate surfaces 9 which abut one another at said median transverse plane II—II. The inner surfaces 10 of said portions 8 have a divergent taper towards the surfaces 9, to concentrate the magnetic flux towards the conjoint parts of the portions 8, which form the opposite or S pair of poles.

It will be seen from FIGS. 1–3 that there is a continuous gap between the internal surfaces of the ferrogmagnetic element 1 and the yoke made of the conjoined elements 4, which gap has transverse portions 11 at each end of the pole projections and portions 12 in planes parallel or substantially radial to the axis at the sides of the pole projections, and is otherwise circumferential partly around a middle portion of the element 1 between said pole projections at 13, 13, (FIG. 2) and completely around the two cylindrical portions 3 of said first element, as shown at 14. This gap is filled with a non-magnetic metal which preferably has a good electrical conductivity, to function as a damping winding, such as brass or Phosphor bronze or for better bonding a stainless steel of low permeability.

Figure 4:
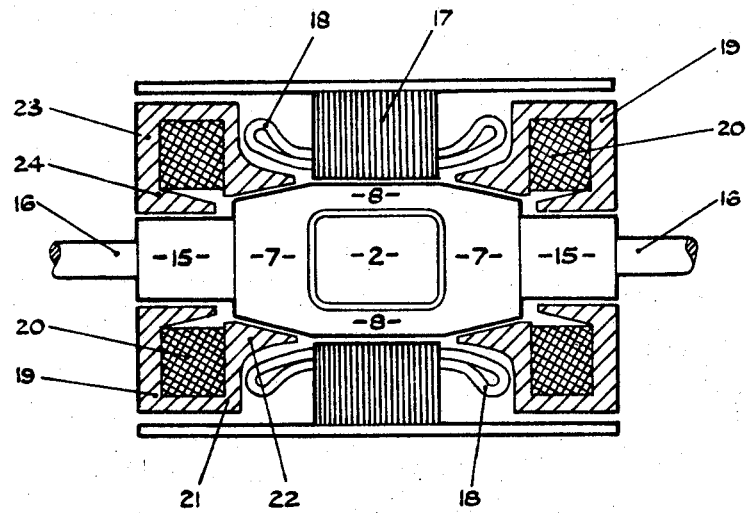
FIG. 4 is a diametrical section of an alternator.

Said first element 1 has, beyond the portions 3, as shown in FIG. 1 and more clearly in FIG. 4 a pair of further cylindrical portions 15 which are included within the magnetic circuit, and at each end a bearing trunnion 16.

A rotor as described has a diameter of 120 mm. over the arcuate surfaces of the portions 8 and the pole projections 2, and is suitable for rotation at 29,000 r.p.m., in an alternator arranged as shown in FIG. 4. In this alternator, the middle portion of the rotor, which comprises the poles 2 and 8, is surrounded by a stator core 17 on which stator windings 18 are mounted. The surfaces of the taper portions 7 and the cylindrical portions 15 of the rotor are surrounded by a pair of annular casings 19 for excitation coils 20. Each of the casings 19 has in radial section a hollow inwardly open, rectangular form, the inner limb or wall 21 having at its internal periphery a tapered section 22 which closely surrounds the tapered surfacee 7, and the outer limb or wall 23 having at its internal periphery a broad foot section 24 which closely surrounds the cylindrical portion 15. These sections 22 and 24 serve as magnetic slip rings, and the magnetic circuit is made from the N poles 2 through the element 1 to the surfaces 15 thereof, and through the sections 24, 23, 21, 22, back to the surfaces 7 of the second ferrogmagnetic element and thence to the S pole surfaces 8 thereof.

Figure 5:
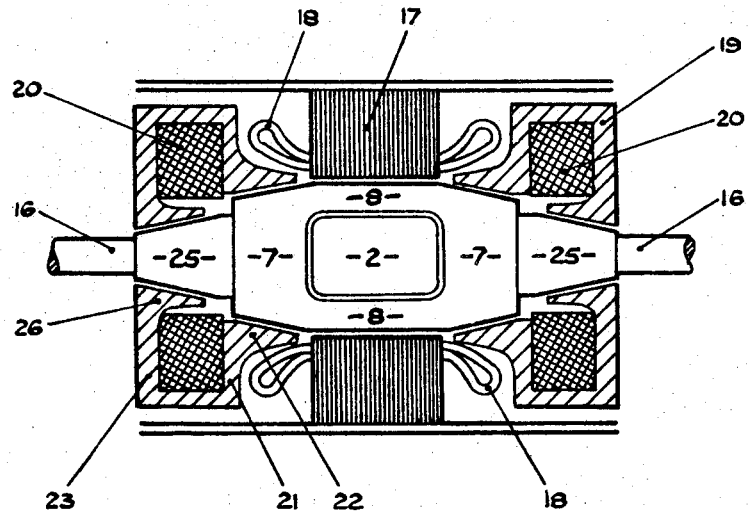
FIG. 5 is a diametrical section of a modified alternator.

In the modified rotor as shown in FIG. 5, which is essentially constructed of ferromagnetic elements as described with reference to FIGS. 1–3, the cylindrical portions 15 are substituted by portions 25 having an outwardly reducing taper the angle of which is equal to that of the tapered portions 7. The casings 19 for the excitation coils are correspondingly modified by the provision at the internal peripheries of their outer walls 23 of correspondingly tapered foot sections 26, which closely surround the tapered surfaces 25. This arrangement enables precise adjustment of the air gaps between the portions 7, 22 and 25, 26 respectively, by axial displacement of the coil casings 19.

The invention provides for a high speed alternator a rotor which has great strength and high resistance to bursting stresses or distortion when running at high rates of rotation, and an alternator including such rotor which is provided with robust excitation coils and in which the rotor is entirely surrounded by substantial and circumferentially continuous members, namely, the stator core and the pair of excitation coil casings.

What I claim and desire to secure by Letters Patent is:

1. A solid rotor for a high speed electric alternator, comprising firstly a ferromagnetic element having at the middle portion of its length at least one radial pole projection, a solid cylindrical portion on each side of said middle portion, a further portion in the form of a solid of revolution beyond each of said cylindrical portions, and a bearing trunnion at each end; and secondly a yoke comprising two enantiomorphic ferromagnetic ring elements each having at least one recess to accommodate one half of said radial pole projection and, to surround one of said solid cylindrical portions, a continuous end having an external periphery with a reducing taper outwardly from said recess, the two yoke elements being secured together at the median plane where they abut each other by the peripheral surface extending between the circumferential limits of the registering recesses in the two yoke elements; said three elements jointly affording a continuous gap between their opposed internal surfaces, which gap is transverse to the axis at each end of said pole projection parallel to the axis at each side of said pole projection and otherwise circumferential; and a non-magnetic material with which said gap is filled to bond the ferromagnetic elements together as a unitary rotor.

2. A two-pole solid rotor as claimed in claim 1, wherein said first element has a single pole projection and each of said two yoke elements as a single recess, the recesses being registered to accommodate said projection, the united portions of said yoke elements opposite said projection affording the other pole when under magnetic excitation.

3. A solid rotor as claimed in claim 1, having a number of pairs of poles, wherein said first element has the like number of pole projections and each of said two yoke elements has the like number of recesses to accommodate said projections, the portions of said yoke elements united between the pole projections affording the magnetically opposite poles when under excitation.

4. A solid rotor as claimed in claim 1, wherein each of said further portions of the first element, which extends beyond the end of one of the yoke elements, is cylindrical.

5. A solid rotor as claimed in claim 1, wherein each of said further portions of the first element, which extends beyond the end of one of the yoke elements, has a taper reducing from said end, which taper has the same angle as that of the yoke end portion.

6. A high speed alternator, comprising a solid rotor as claimed in claim 1, and a core on which stator windings are mounted, said core completely surrounding the middle portion of the rotor which comprises the poles.

7. A high speed alternator as claimed in claim 6, having said tapered end of each yoke portion, and the contiguous portion of the rotor extending from said end, surrounded by one of a pair of annular excitation coil casings.

8. A high speed alternator as claimed in claim 7, wherein each of said casings has in radial section a hollow inwardly open, rectangular form, a tapered section on one limb which closely surrounds said tapered portion of one yoke element of the rotor, a broad foot section on the other limb which surrounds the portion of said first element of the rotor that projects from the yoke element, and an excitation coil housed within the hollow interior of each casing.

9. A high speed alternator comprising a solid rotor as claimed in claim 4, a core on which stator windings are mounted, said core completely surrounding the middle portion of the rotor which comprises the poles, a pair of annular excitation coil casings each surrounding the tapered end of one of the yoke portions and the cylindrical contiguous portion of the rotor, each of said casings having in radial section a hollow, inwardly open, rectangular form, a tapered section on one limb which closely surrounds said tapered yoke end portion, a broad foot section on the other limb which is internally cylindrical and closely surrounds said cylindrical portion, and an excitation coil housed within the hollow interior of each casing.

10. A high speed alternator comprising a solid rotor as claimed in claim 5, a core on which stator windings are mounted, said core completely surrounding the middle portion of the rotor which comprises the poles, a pair of annular excitation coil casings each surrounding the tapered end of one of the yoke portions and the tapered contiguous portion of the rotor, each of said casings having in radial section a hollow, inwardly open, rectangular form, a tapered section on one limb which closely surrounds said tapered yoke end portion, a broad foot section on the other limb which is internally tapered and closely surrounds said tapered contiguous portion, and an excitation coil housed within the hollow interior of each casing.

References Cited

UNITED STATES PATENTS

| | | | |
|---|---|---|---|
| 2,796,542 | 6/1957 | Bekey et al. | 310—168 |
| 2,802,959 | 8/1957 | Powers | 310—263 |
| 3,223,866 | 12/1965 | Tiltins | 310—263 |
| 3,309,547 | 3/1967 | Woodward | 310—263 |
| 3,319,100 | 5/1967 | Erickson | 310—168 |
| 3,321,652 | 5/1967 | Opel | 310—263 |

MILTON O. HIRSHFIELD, *Primary Examiner.*

L. L. SMITH, *Assistant Examiner.*